Aug. 30, 1960
O. BJERING
2,950,842
CLOSURE CAP FEEDER MECHANISM
Filed Jan. 28, 1957
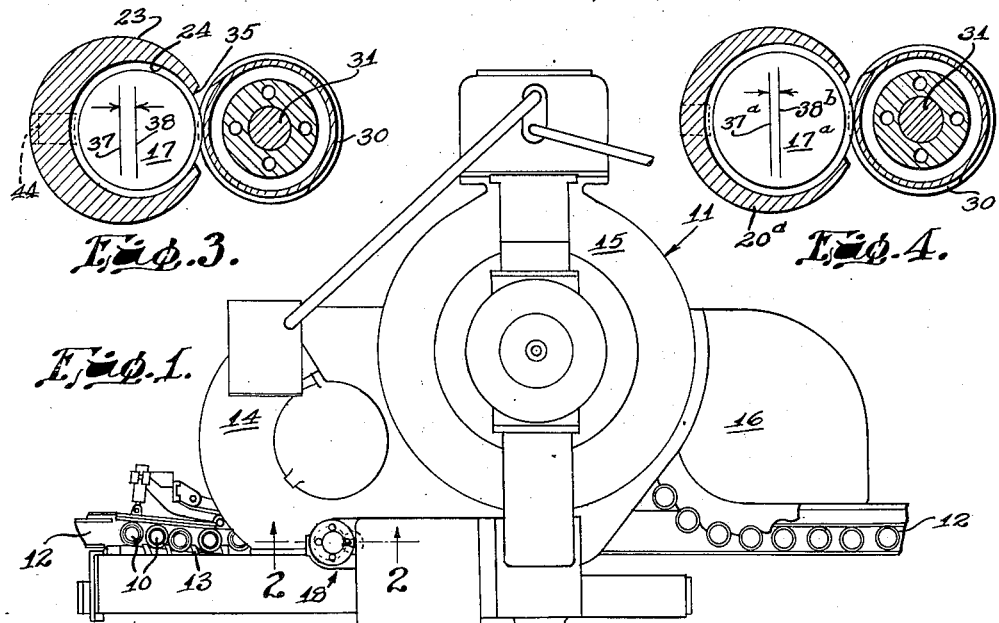
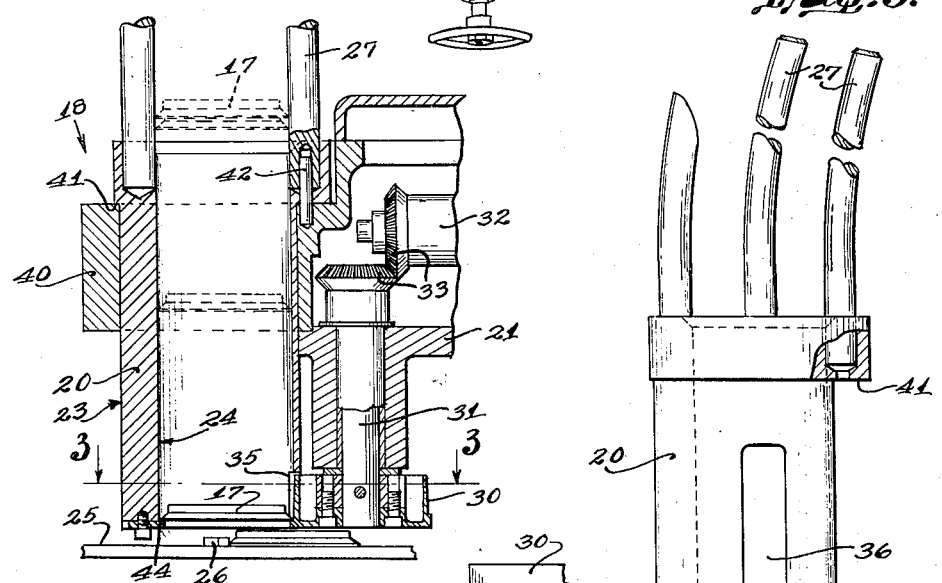
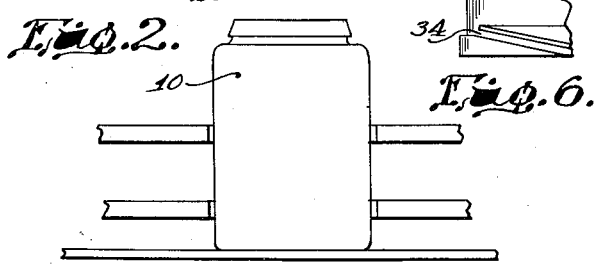
INVENTOR
OLAV BJERING
BY
Rule Hoge
ATTORNEYS

United States Patent Office 2,950,842
Patented Aug. 30, 1960

2,950,842

CLOSURE CAP FEEDER MECHANISM

Olav Bjering, Toledo, Ohio, assignor to Owens-Illinois Glass Company, a corporation of Ohio Filed Jan. 28, 1957, Ser. No. 636,707

1 Claim. (Cl. 221—251)

My invention relates to mechanism for feeding or transferring articles such as closure caps from one position to another. The invention is of utility when used in connection with or as forming a part of a machine for applying closure caps to containers such as bottles or jars.

Machines of this type are adapted for sealing a variety of containers requiring closure caps of different sizes. This in practice makes frequent changes and adjustments necessary and interchanges of parts as called for by the various sizes of the workpieces. The present invention provides a novel form of means for holding the stack of closure caps which are being transferred to the containers, such means including quickly changeable holders for the caps, each holder being adapted for use with caps of a particular size.

In the machine herein illustrated the closure caps are stacked in a vertically disposed tubular holder, herein referred to as the cap feed sleeve. The containers are brought in succession to a position beneath and in register with the stack of caps. A transfer device, in its preferred form comprising a screw, is positioned at one side of the stack and by rotation about a vertical axis operates to withdraw the caps in succession from the bottom of the stack for transfer to the containers therebeneath. The cap feed sleeve is in the form of a cylinder having an interior passageway, circular in cross section, to support and guide the stack of caps. The interior wall surface of the sleeve is eccentric to the exterior wall surface. The feed screw operates through an opening in the side wall of the sleeve to withdraw the closure caps for transfer to the containers. The sleeve is removably attached to the machine frame for replacement by other sleeves designed for different sized caps. All of the sleeves or holders are of the same external diameter to permit ready interchange with each other, while the bores or interior diameters of the holders vary. The eccentricity of the bore also varies with its size and in such manner that the closure caps are held in cooperation with the screw feeder without requiring adjustment of the latter.

Referring to the accompanying drawings:

Fig. 1 is a partly diagrammatic plan view of a machine for applying caps to filled containers and sealing the caps on the containers;

Fig. 2 is a sectional elevation at the line 2—2 on Fig. 1, showing the cap feeding and transfer mechanism;

Fig. 3 is a section at the line 3—3 of Fig. 2;

Fig. 4 is a view similar to Fig. 3 but with the holder replaced by another holder designed for use with closure caps of larger diameter;

Fig. 5 is an elevational view of the cap feed sleeve or holder and guide rods; and Fig. 6 is a fragmentary view of the lower portion of the feed screw.

The present invention is herein shown as embodied in a machine of the type shown and described in U.S. patent to Ninneman et al., 2,659,522, November 17, 1953, Cap Feeding Mechanism.

Referring to Fig. 1, containers 10, which have been previously filled, are fed into a sealing machine 11 by a conveyor 12, the containers being spaced on the conveyor by a spiral spacer 13. The sealing machine comprises sections 14, 15, and 16. As the containers are carried through the first section 14 closure caps 17 (Fig. 2) are delivered or fed by cap feeding mechanism 18 to the containers 10 and carried with the containers through the sealing machine. The caps are sealed to the containers while in the section 15 and the sealed containers are thereafter removed by the section 16 and returned to the conveyor 12.

Referring to Fig. 2, the cap feeding mechanism 18 includes a tubular holder or cap feed sleeve 20. This sleeve is removably mounted in a stationary gear case 21. The cylindrical bore of the sleeve 20, circular in cross section, is eccentric to the outer cylindrical surface 23 of the sleeve. The purpose of this eccentric construction will be described hereinafter. The inner wall surface 24 of the sleeve is of slightly greater diameter than the diameter of the caps 17 to permit the latter to move freely downward by gravity to the lower end of the sleeve. The caps 17 are transferred in succession, as presently described, to a horizontal rotating plate 25 beneath and spaced below the sleeve. Lugs 26 on the plate 25 carry the caps forwardly away from the sleeve 20. Guide rods 27 attached to the cap feed sleeve 20 provide means for guiding the caps 17 into the sleeve.

A cap transfer screw 30 is keyed to the lower end of a vertical screw shaft 31 journalled in the gear case 21. The screw shaft 31 is rotated by a power driven shaft 32 having driving connection through miter gears 33 to the screw shaft. The screw 30 is formed with an inclined spiral surface or screw thread 34 (Fig. 6) and with a horizontal bottom surface at substantially the same level as the lower end of the sleeve 20. The sleeve and screw are spaced above the plate 25 a sufficient distance to permit the passage of the closure caps 17 while preventing any substantial vertical or tilting movement of the caps as they advance beneath the screw 30. As the screw rotates, the thread 34 engages the rim of the lowermost cap 17 in the sleeve 20 and thereby moves the cap downwardly, releasing it from the sleeve and transferring it to the rotating plate 25 so that the cap is carried horizontally away from the feed sleeve. The feed sleeve 20 has a lower end portion cut away at 35 to provide an opening into which the screw 30 protrudes for engagement with the caps 17. The feed sleeve 20 is also formed with a vertically elongated opening 36 permitting observation of the caps within the feed sleeve.

As shown in Fig. 3 the wall of the cap sleeve 20 at the opening 35 is crescent shape in cross section. The eccentricity of the bore of the cap sleeve is such that the peripheral surface of a cap 17 therein will contact the screw 30, entering the spiral groove 34 as the screw rotates so that the cap is forced downward and released from the feed sleeve 20 for transfer to the plate 25.

Referring to Fig. 3, vertical lines 37 and 38 extend respectively through the center of the sleeve 20 and the center of the cap 17 therein, the distance between these lines indicating the eccentricity. The cap feed sleeve 20 is readily removable and interchangeable with other cap sleeves having bores of different sizes to accommodate caps of different sizes. Fig. 4 shows a cap feed sleeve 20a designed for feeding caps 17a of larger diameter than the caps 17 in Fig. 3. It will be seen that the lines 37a and 38b, corresponding to the lines 37 and 38 respectively of Fig. 3, are comparatively close together owing to the larger size of the caps and internal diameter of the sleeve. The distance, however, between the cap and the screw shaft 31 remains the same, regardless of the internal diameter of the sleeve and size of the closure caps which are being transferred. As the exterior diameter of the cap feed sleeve 20 remains the same for all sleeves, the only change required when a cap of a different size is to be used is the removing one sleeve 20 and replacing it by another one. The eccentricity of the cap sleeve bore is reduced to zero for the largest size of cap which may be used with the machine. Thus for the largest size cap the bore of the feed sleeve is positioned centrally within the sleeve, concentric with the exterior surface.

The means for removably mounting the cap feed sleeve 20 comprises the holder 40 which may be an integral part of the gear case 21. The holder is in the form of a circular collar to surround the sleeve 20. The upper end portion of the sleeve 20 is enlarged to provide a shoulder 41 extending over the collar 40. A pin 42 extends through an opening in the sleeve 20 and downward into a bore within the holder 40 thereby holding the sleeve against rotative movement. With this construction the sleeve 20 is readily removable by lifting it vertically through the collar 40 permitting another sleeve to be mounted in its place. A horizontal plate 44 attached to the lower end of the sleeve 20 provides a narrow ledge extending along the inner surface of the sleeve and forming a support for the closure caps 17.

Modifications may be resorted to within the spirit and scope of my invention.

I claim:

In apparatus for transferring closure caps, a cap feed sleeve holder having a cylindrical bore extending substantially vertically therethrough, a driven feed screw rotatable on an axis substantially parallel with the bore axis, said screw positioned in a plane below the holder and having a peripheral closure cap separating portion projecting into a circle defined by an imaginary axially downward extension of the wall of said cylindrical bore, a readily removable cap feed sleeve in the holder for containing a stack of closure caps, said sleeve being of circular exterior form and fitted into the holder with portions extending both above and below the latter, said sleeve having an eccentrically positioned longitudinal bore therethrough with the wall of radially thinnest dimensions being contiguous to the feed screw, said sleeve having the lower end of the thinnest wall section cut away to provide a radial opening through which the peripheral portion of the feed screw projects into cap operating engagement with the closure caps.

References Cited in the file of this patent

UNITED STATES PATENTS

| | | |
|---|---|---|
| 2,304,437 | Bell | Dec. 8, 1942 |
| 2,659,522 | Ninneman et al. | Nov. 17, 1953 |
| 2,666,563 | Stover | Jan. 19, 1954 |